(12) United States Patent
Liberkowski (10) Patent No.: US 7,753,442 B2
(45) Date of Patent: Jul. 13, 2010

(54) SPHERICALLY GUIDED SAFETY SEATING SYSTEM

(75) Inventor: Janusz Liberkowski, Los Gatos, CA (US)

(73) Assignee: Anecia LLC, Los Gatos, CA (US)

( * ) Notice: Subject to any disclaimer, the term of this patent is extended or adjusted under 35 U.S.C. 154(b) by 65 days.

(21) Appl. No.: 11/422,572

(22) Filed: Jun. 6, 2006

(65) Prior Publication Data

US 2007/0132287 A1 Jun. 14, 2007

Related U.S. Application Data

(60) Provisional application No. 60/749,208, filed on Dec. 9, 2005.

(51) Int. Cl.
*B60N 2/28* (2006.01)

(52) U.S. Cl. ............. 297/216.11; 297/216.19; 297/256.14; 297/256.16

(58) Field of Classification Search ........ 297/216.1, 297/216.11, 256.13, 256.15, 256.16, 216.16, 297/216.19
See application file for complete search history.

(56) References Cited

U.S. PATENT DOCUMENTS

| | | | |
|---|---|---|---|
| 2,227,717 A | 1/1941 | Jones | |
| 2,282,763 A | 5/1942 | Kennedy | |
| 2,357,781 A | 9/1944 | Randol | |
| 2,823,730 A | 2/1958 | Lawrence | |
| 3,112,955 A | 12/1963 | Stolz | |
| 3,159,850 A * | 12/1964 | Aldrich et. al. | 5/94 |
| 3,357,736 A | 12/1967 | McCarthy | |
| 3,589,466 A | 6/1971 | Dudley | |
| 3,833,946 A | 9/1974 | Von Wimmersperg | |
| 4,027,915 A * | 6/1977 | Anderson et al. | 297/184.13 |
| 4,386,787 A * | 6/1983 | Maplethorpe et al. | 280/206 |
| 4,401,314 A * | 8/1983 | Zimmerman | 280/206 |
| D278,766 S | 5/1985 | Krume | |
| 4,627,659 A | 12/1986 | Hall | |
| 4,713,030 A * | 12/1987 | Ingle | 440/99 |
| 4,762,364 A | 8/1988 | Young | |
| 4,898,377 A | 2/1990 | Roche | |

(Continued)

FOREIGN PATENT DOCUMENTS

DE 19540962 5/1997

(Continued)

*Primary Examiner*—David Dunn
*Assistant Examiner*—Patrick Lynch
(74) *Attorney, Agent, or Firm*—Wilson Sonsini Goodrich & Rosati (57) ABSTRACT

A base for fixing the safety seating system in a passenger car has an external guiding member that more than equatorially encompasses an internal guiding member for a direct spherical guiding of a removable seated newly born infant. The infant is seated with respect to the geometrical pivoting center and an overall mass axis of the rotating portions such that neck bending and head whip lashing are minimized during a vehicle crash. The encompassing spherical and direct guiding provides for a free impact aligned reorientation of the seated infant unimpeded by adjacent elements of the car that are eventually forced into contact during crash. The direct spherical guiding provides also for a lightweight construction of the rotating portions with low momentum of inertia and consequently high responsiveness of the safety seating system.

18 Claims, 11 Drawing Sheets

U.S. PATENT DOCUMENTS

| | | | |
|---|---|---|---|
| 4,936,629 A | 6/1990 | Young | |
| 4,971,392 A | 11/1990 | Young | |
| 5,292,175 A | 3/1994 | Artz | |
| D346,070 S | 4/1994 | Kither | |
| D347,954 S * | 6/1994 | Sedlack | D6/491 |
| 5,366,034 A * | 11/1994 | Meyers | 180/21 |
| 5,551,920 A * | 9/1996 | Ogden et al. | 472/59 |
| 5,660,434 A * | 8/1997 | Nicksic | 297/216.11 |
| 5,716,095 A * | 2/1998 | Lopez | 297/184.13 |
| 5,722,719 A * | 3/1998 | Glomstad | 297/216.11 |
| 5,795,020 A * | 8/1998 | Sirico | 297/256.15 |
| 5,806,924 A | 9/1998 | Gonas | |
| 5,884,967 A * | 3/1999 | Gasper | 297/216.11 |
| 5,887,944 A | 3/1999 | Boost | |
| 5,979,827 A * | 11/1999 | Corcoran | 244/122 R |
| 6,058,529 A * | 5/2000 | Goysich | 5/94 |
| 6,298,934 B1 * | 10/2001 | Shteingold | 180/10 |
| 6,431,647 B2 | 8/2002 | Yamazaki | |
| 6,439,660 B1 | 8/2002 | Guenther | |
| 6,482,060 B1 | 11/2002 | Gorny et al. | |
| 6,634,708 B2 | 10/2003 | Guenther | |
| 6,739,659 B2 | 5/2004 | Dukes | |
| 6,938,954 B1 | 9/2005 | Hendren et al. | |
| 6,968,799 B2 * | 11/2005 | Humiston, Jr. | 114/350 |
| 2002/0060483 A1 | 5/2002 | Yoshida et al. | |
| 2002/0195851 A1 | 12/2002 | Kassai et al. | |

FOREIGN PATENT DOCUMENTS

| | | |
|---|---|---|
| FR | 2645477 | 10/1990 |
| FR | 2689464 | 10/1993 |
| JP | 53033026 | 4/1987 |
| JP | 10100760 | 4/1998 |

* cited by examiner

SPHERICALLY GUIDED SAFETY SEATING SYSTEM

CROSS REFERENCE

The present application claims priority to Provisional Patent Application No. 60/749,208 filed Dec. 9, 2005, which is hereby incorporated by reference.

FIELD OF INVENTION

The present invention relates to spherically guided seating systems for safely seating a human in a vehicle. In particular, the present invention relates to spherically guided safety seating systems configured in accordance with rotational impact response characteristics of a human seated with respect to a primary impact plane of a vehicle.

BACKGROUND OF INVENTION

Safety seating of humans in vehicles and devices moving with ever increasing speeds has been addressed in the prior art in manifold ways. Besides most commonly used seat belts and air bags, pivoting seats have been introduced to adjust the sitting position to off-vertical gravitational loads. For example, a number of aircraft and car seats have been described in U.S. Pat. Nos. 2,227,717; 3,112,955; 2,823,730; 3,357,736 that provide a pivoting movement around an axis perpendicular to a vehicle's movement direction. Such seat designs were thought to adjust a seated persons position in response to a frontal impact.

Significant dynamic gravitational load changes away from vertical orientation have been recognized also for example in fly simulating devices. There, varying centrifugal loads resulting from undulating rotational movements of the seated person are compensated by seating capsules hinging around two perpendicularly acting joints. The capsules overall center of gravity is kept in an offset to both axes such that the capsule is aligning itself with varyingly directed gravitational accelerations. In that way, gravitational loads may be experienced by a person seated in the capsule predominantly in vertical direction with respect to the person's seating position irrespective of the spatial orientation of a sum gravitational acceleration vector acting from the outside via the two axes onto the capsule. See for example U.S. Pat. Nos. 2,282,763; 2,357,781; 4,898,377.

The concept of such double axes suspension of a seating capsule has been applied in the prior art to a child safety seat to be mounted in a car as described in U.S. Pat. Nos. 6,439,660 and 6,634,708 both invented by John Guenther. Guenther attempts to safely seat a child also against other than frontal vehicle impacts. Guenther as well as the above listed hinging safety seats fail to address the particularities of rotational impact response characteristics of a human seated with respect to a primary impact vector or primary impact plane of a vehicle. By not taking into account these particularities and as described in detail below and in reference to the Prior Art FIGS. 1A, 1B, most prior art hinging safety seating devices in fact expose the seated person to increased risks of neck injuries and well known head whip lashing compared to rigid safety seating systems.

Figure 1A:
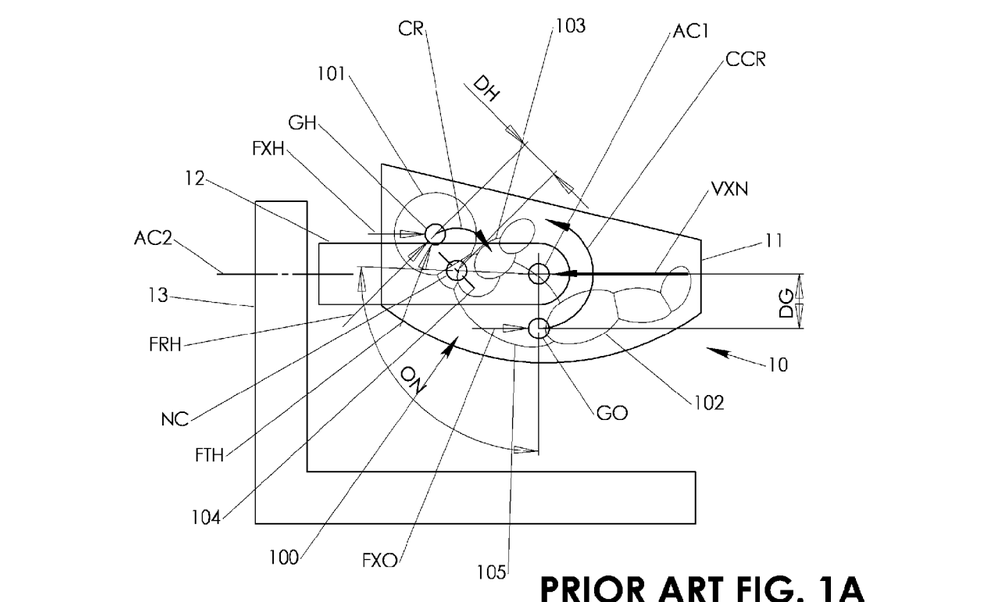
Figure 1B:
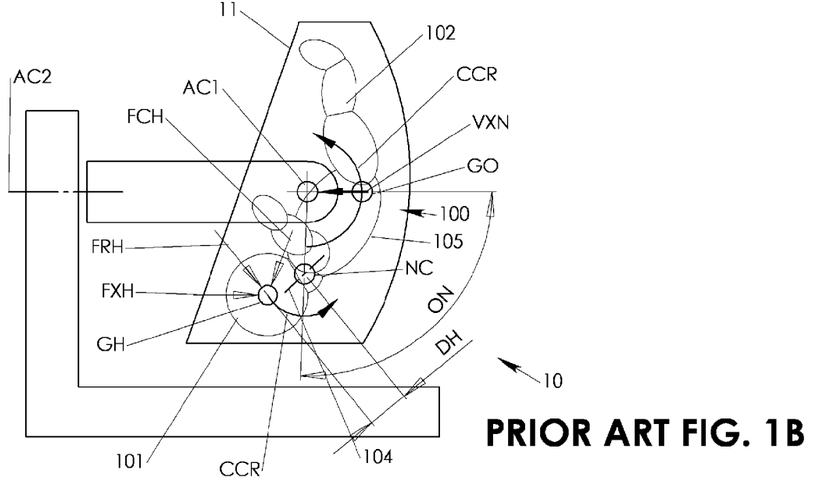
FIG. 1B shows the prior art child safety seat of FIG. 1A with the capsule being in an erroneous impact aligned orientation.

The main difference between fly simulating devices and safety seating devices are gradients of acceleration and deceleration force direction changes. Such gradients may be more than a magnitude higher in case of a sudden vehicle impact during which decelerations occur in multiples of the common gravitational acceleration experienced on earth as is well known to anyone skilled in the art. In a hinged capsule or seat 11, the deceleration VXN is transferred onto the seat/capsule 11 via hinge(s) AC1, (AC2). In single hinge prior art safety seats, naturally only one hinge AC1 is employed. In double hinge prior art seating capsules, two hinges AC1, AC2 are employed. In a freely suspended seat/capsule 11, an overall center of gravity GO including the gravity centers of the seated human 100 and the seat/capsule 11 is resting vertically below the hinge(s) AC1, (AC2) in an impact initial position where only gravitational acceleration acts on the seat/capsule 11 and human.

During an impact where the vehicle is rapidly decelerated, an overall mass reaction force FXO acts in direction opposite and parallel with respect to the deceleration VXN. The overall mass reaction force FXO introduces a main torque around the hinge(s) AC1, (AC2) on the seat/capsule 11. The overall mass may include the mass of the human 100 and the seat/capsule 11. The main torque resulting from the overall mass reaction force FXO multiplied with a main normal distance DG between deceleration vector VXN and overall gravity center GO rotationally accelerates the seat/capsule 11 with the seated human 100 around the axis AC1. The main normal distance DG is the distance between the overall gravity center GO to the acting hinge AC1 in direction normal the impact deceleration VXN vector.

In the example of Prior Art FIGS. 1A, 1B, the main rotational acceleration results in a counterclockwise rotation CCR of the seat/capsule 11 and those human 100 body portions belted on the seat/capsule 11. The rotational acceleration is opposed by an overall momentum of inertia of the seat/capsule 11 and all rotationally rigidly connected portion(s) of the human 100 resulting in a response time it takes for the seat/capsule 11 to move from an impact initial orientation depicted in Prior Art FIG. 1A into a impact aligned orientation where the overall center of gravity GO is again aligned with deceleration VXN vector as depicted in Prior Art FIG. 1B.

The main human body part rigidly connected with the seat/capsule 11 may be the torso 105 commonly belted up the seat/capsule 11. Head 101, arms 103 and legs 102 hinge on the torso 105 and receive their rotational acceleration around hinge AC1 via neck 104 and respective shoulder and hip joints. The head 101 has the largest mass with its head gravity center GH being in head normal distance DH with respect to an approximate neck center NC. Head normal distance DH are is normal with respect to a resulting head mass force FRH.

At the impact initial position of Prior Art FIG. 1A, the resulting head mass force FRH is composed in a well known manner of an impact head reaction mass force FXH and a rotational acceleration head reaction mass force FTH both described in the below. As the angular speed of the seat/capsule 11 ramps up from zero at the impact initial orientation, a centrifugal head reaction mass force FCH occurs and contributes to the resulting head mass force FRH as well. At the impact aligned orientation of Prior Art FIG. 1B, rotational acceleration is down to zero and only impact head reaction mass force FXH and dependent on a residual rotational speed of the seat/capsule 11 an eventual centrifugal head reaction mass force FCH may contribute to the resulting mass force FRH.

As can be seen in Prior Art FIG. 1A, the resulting head mass force FRH is oriented clockwise with respect to the neck center NC and in head normal distance DH, which together resulting in a clockwise rotation CR that is in opposite direction than the counterclockwise rotation CCR of the sea/capsule 11 and the belted up torso 105. The neck 104 has to compensate the two opposing rotations CR, CCR which may cause excessive neck bending. As the rotational speed of the seat/capsule 11 ramps up, centrifugal head reaction mass force FCH increases, while impact head reaction mass force FXH and/or rotational acceleration head reaction mass force FTH may decrease to a point where the orientation of the resulting head mass force FXH becomes oriented also in counterclockwise direction with respect to the neck center NC. The head 101 is consequently rotated back around the neck center NC until it is stopped by the seat's/capsule's 11 upholstery. During a crash related impact, this takes places within a fraction of a second resulting in a well known whip lashing of the head, which may be significantly stronger compared to a conventionally seated child due to the initial excessive neck bending and additional centrifugal head reaction mass force FCH that is not present in a conventionally seated child's head.

The clockwise rotation CR of the head 101 resulting from the opposite rotational acceleration continues as long as the head gravity center GH remains above the neck center NC while the torso is already in counterclockwise rotation CCR. This oppositely acting head 101 tilting torque induced during the time span it takes for the head normal distance DH to decrease to zero produces an counter rotating head 101 tilting energy that may cause excessive bending of the neck 104. Once the rotation of the seat/capsule 11 and the torso 105 has progressed to the extent that the head gravity center GH moves below the neck center NC the rotational acceleration of the head 101 is reversed and the head whip lashes back. The whip lashing may be even amplified by centrifugal forces acting on the head 101 at that moment.

Also not addressed in the Prior Art is another particularity of the rotational impact response characteristic of pivotally seated human 100 that may be related to an neck center angle ON between the overall gravity center GO and the approximate neck center NC. The closer to or even worse larger than ninety degrees the neck center angle ON, the longer and initially larger are the effects of the deceleration VXN transmitted onto the neck 104. This is because the closer or larger the neck center angle ON to ninety degrees, the more the neck 104 initially moves perpendicular with respect to the deceleration VXN vector while the seat/capsule 11 rotates. This again prolongs the time span and overall amount of the deceleration VXN transmitted onto the neck center NC resulting in prolonged impact head reaction mass force FXH and ultimately increases a counter rotating head 101 tilting energy that the neck 104 has to absorb as may be well understood by anyone skilled in the art.

Referring to Prior Art FIG. 1B, another unfavorable result of the neck center angle ON being close to or larger than ninety degrees may be a non perpendicular final orientation of the neck 104 during impact aligned orientation of the seat/capsule 11 in which the overall gravity center GO is aligned with the deceleration VXN vector through the hinge AC1. The larger the neck 104 center angle ON the more the final neck 104 orientation may be out of perpendicularity.

In summary, prior art pivoting safety seats or capsules 11 may adversely effect a seated human's safety particularly against neck injuries, resulting from excessive neck bending, excessive rotating head 101 tilting energy, head whip lashing and non perpendicular final neck 104 orientation. Therefore, there exists a need for a safety seating system that minimizes the risk of excessive neck 104 bending, excessive rotating head 101 tilting energy, and head 101 whip lashing of a rotationally seated human. The present invention addresses this need.

Figure 2:
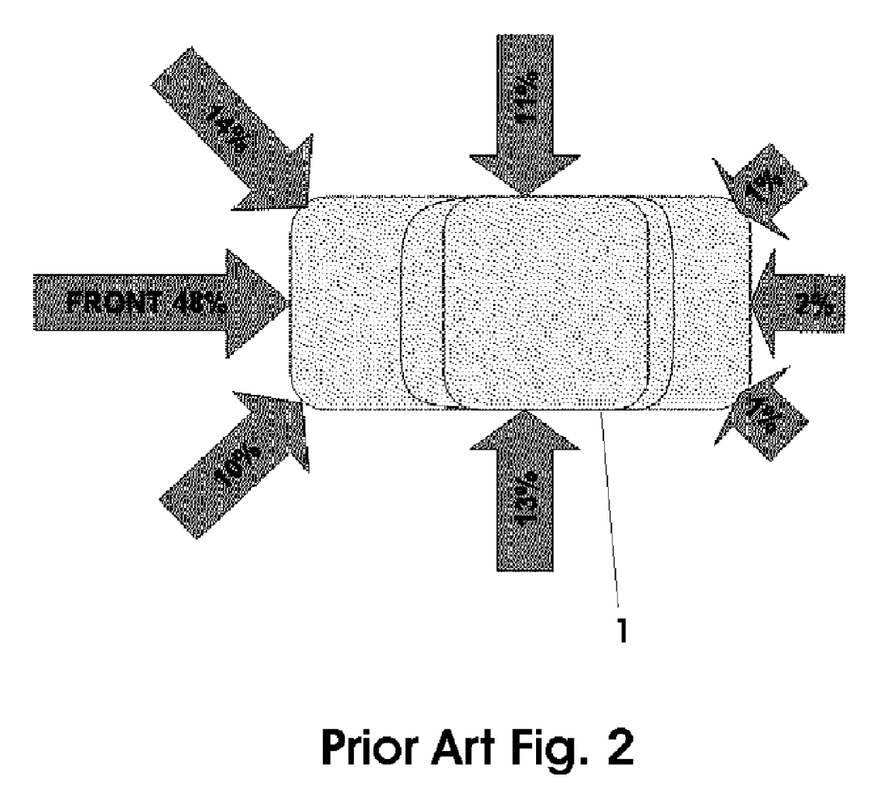
FIG. 2 depicts statistic probabilities of crash impact directions of a passenger car known to the inventor at the time this invention was made.

In a real case of a vehicle crash, decelerations and eventual accelerations acting on the hinges AC1, AC2 may be of complex primarily two dimensional nature resulting from varying impact directions. Probabilities of impact directions of a passenger car known to the inventor at the time this invention was made are shown in Prior Art FIG. 2. In some cases, like during a rollover, the decelerations may even be of a three dimensional nature. Such complex primarily two dimensional and eventually even three dimensional decelerations may result in rapidly reorienting torques initiating rotational movements in varying directions around the hinges AC1, AC2. The torso 105 belted up to the capsule 11 follows these movements directly whereas the head 101 with its mass may lag behind, which again may cause undesirable neck 104 bending. The further the head gravity center GH is horizontally away from an intersection of the hinges AC1, AC2, the more violent the head 101 may dangle in such situations with respect to the belted up torso 105. Therefore, there exists a need for a safety seating system in which head 101 dangling due to multi dimensional deceleration patterns that eventually occur during a vehicle crash are kept to a minimum. The present invention addresses also this need.

Child safety seats are commonly fixed on top of the upholstery of either a rear or a front passenger seat. The inherent softness of the upholstery renders a rigid fixing of the child safety seat practically impossible. In case of a prior art child safety seat 10 having a capsule 11 double hinged via a cardan arm 12 on a base 13, the rotational movement of the capsule 11 during an impact is likely impeded by adjacent objects such as door handles, front seat backrest in case of a backseat mounting or a dashboard in case of a front seat mounting of the child safety seat 10. In addition, a deploying air bag may push the capsule 11 into an unfavorable orientation. Therefore, there exists a need for a child safety seat that may rotationally reorient itself during an impact unimpeded by eventual contact with adjacent objects and/or unimpeded by an eventually deploying air bag. The present invention addresses also this need.

The use of hinges and an eventual cardan arm 12 to rotationally hold a seat/capsule 11 with respect to the base 13 requires increased stiffness of the seat/capsule 11 to channel the extreme mass forces that may occur during a crash onto the relatively small hinges AC1, AC2 as may be clear to anyone skilled in the art. This in turn results in increased mass and momentum of inertia of the seat/capsule 11. In addition, deformation in the hinges and in the eventual cardan arm 12 need to be accounted for as well and sufficient spacing between the seat/capsule 11 needs to be provided between the individual parts that move with respect to each other. For a given installation space available in a passenger car, the size of the seat/capsule 11 is consequently limited by such spacing constraints, which in turn forces a positioning of the child close the hinges AC1, AC2 resulting in a large neck center angle ON. Therefore, there exists a need for a rotationally reorienting child safety seating system in which rotational guiding may be provided without use of hinges or intermediate structures in a direct fashion between a rotating capsule and a fixed base that provides for low momentum of inertia and maximum space of the rotating capsule and seating of the child with reduced neck center angle ON. The present invention addresses also this need.

Finally, the rotational speeds induced on a rotating seat/capsule 11 during crashes at varying impact speeds may vary with at least one order of magnitude as may be well appreciated by anyone skilled in the art. A generic brake without any means to adjust itself to the large bandwidth of rotational speeds of the seat/capsule 11 most likely will cause a stopping of the seat/capsule 11 at an unintended final orientation diminishing or even canceling the intended operation of the seat/capsule 11. Therefore, there exists a need for a braking feature that responds to varying rotational speeds of the seat/capsule 11 for an increased reorientation precision. The present invention addresses also this need.

SUMMARY

A human is safely seated in a vehicle by fixing a base of a spherical guiding device substantially concentric within a spherical installation space initially determined within the vehicle. The human is seated inside a spherically guided portion of the spherical guiding device. The spherically guided portion has an outside capsule diameter and is directly guided via the base and concentric with respect to a geometric pivoting center of the base. The human is seated inside the spherically guided portion in close proximity to the outside capsule diameter such that during an initial rotation of the spherically guided portion between an impact initial orientation and an impact aligned orientation a resulting head reaction mass force acts continuously in a non-switching direction around a neck center of the human forcing the head continuously radially outward with respect to the geometric pivoting center into contact with the spherically guided portion. A neck center angle between an overall mass axis and a neck center is substantially less than ninety degrees such that an overall mass reaction force is at least close to perpendicular with respect to the human's neck at the impact aligned orientation. The overall mass axis coincides with the geometric pivoting center and an overall gravity center of both the spherically guided portion and the human. The spherically guided portion or unit is more than equatorially encompassed and directly guided in conjunction with an external spherical guiding member provided by the base.

The device is preferably utilized as safety seating system for safely seating a newly born infant in a passenger car. Other features such as a pivot-protection framing encompassing the spherically guided unit and an eventual centrifugal force proportional brake contribute to a reliable operation of the system during impact. The optimized positioning of the human within the spherically guided unit may minimize neck bending and head whip lashing. Due to the direct guiding, the spherically guided unit may be fabricated from lightweight materials providing low momentum of inertia, which in turn results in short response time.

BRIEF DESCRIPTION OF THE FIGURES

Prior Art FIG. 1A schematically depicts a prior art erroneously hinged capsule of a child safety seat in impact initial orientation.

Prior Art

Prior Art

DETAILED DESCRIPTION

The preferred embodiment of the invention relates to a spherically guided safety seating system 200 for safely seating preferably a newly born infant 100 of up to eight months. The newly born infant 100 may be particularly vulnerable to neck 104 and head 101 injuries resulting from excessive neck bending and head 101 whip lashing. Nevertheless and as may be well appreciated by anyone skilled in the art, the teachings presented below may be applied to humans other than newly born infants 100 as well.

Figure 3:
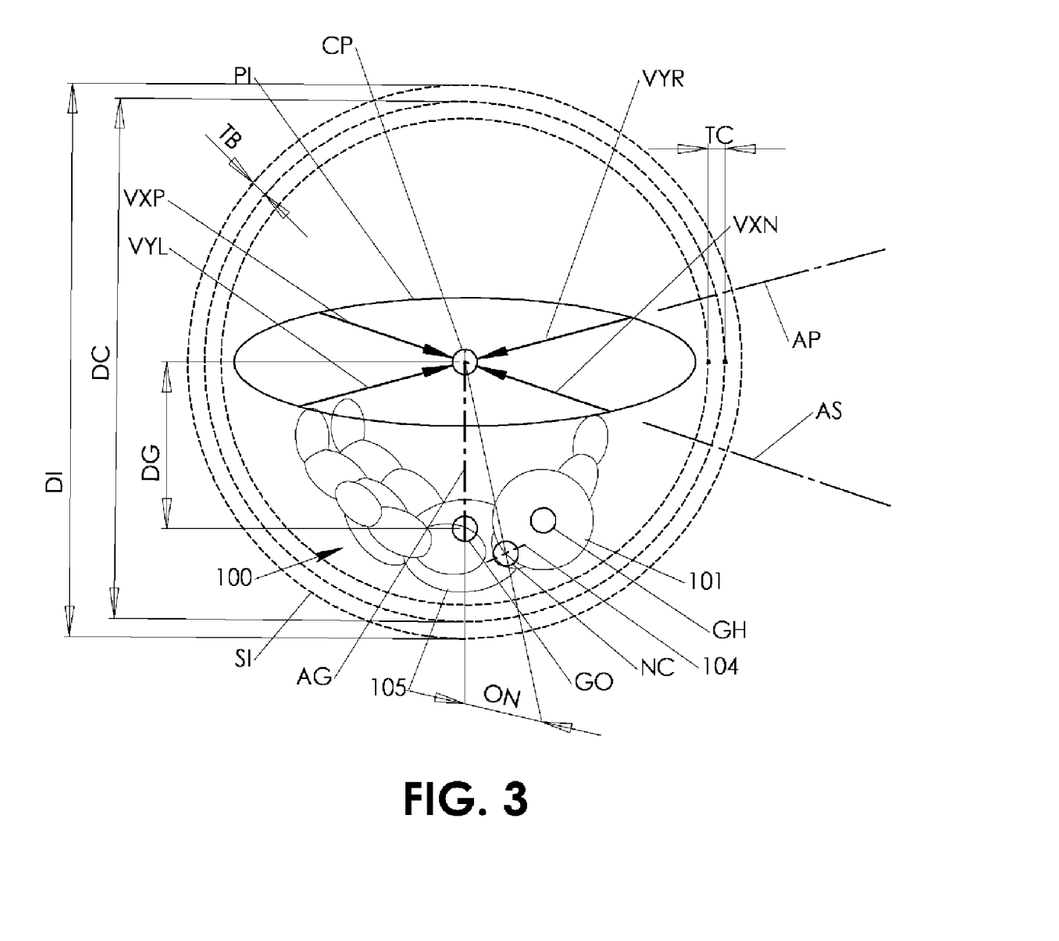
FIG. 3 is a first top perspective view of a newly born infant in safely seated in accordance with the teachings of the present invention.

As described in great detail in the background section and in reference to the Prior Art FIGS. 1A, 1B, excessive neck bending and head whip lashing needs to be minimized during car 1 crash related impacts. For that purpose and as depicted in FIG. 3, 4A, 4B, the infant 100 is during an impact initial orientation preferably seated in close proximity to an outside capsule diameter DC of a spherically guided portion or unit 210 having a capsule thickness TC as also shown in FIGS. 5-7D. The head 101 and the torso 105 of the infant 100 are positioned substantially below a primary impact plane PI, which may be a horizontal plane coinciding with the geometric pivoting center CP. Within the primary impact plane PI may lie primary impact directions VXN, secondary impact directions VXR, VXL and tertiary impact direction VXP. In addition, the head gravity center GH may be in horizontally close proximity to the geometric pivoting center CP, which results in a low and short impact head reaction mass force FXH as may be clear from the teachings in the background section and as may be clear to anyone skilled in the art. Consequently and during an initial rotation of the spherically guided portion 210 between an impact initial orientation shown in FIGS. 4A, 4B, 5, 7A and an impact aligned orientation shown in FIGS. 4C, 7B, 7D a resulting head reaction mass force FRH may act substantially continuous in a non-switching direction around the neck center NC forcing the head 101 continuously radially outward with respect to the geometric pivoting center CP into contact with the spherically guided portion 210 in general and into the seating 211 in particular. This may be marginally the case depicted in FIG. 4A, where the head 101 is behind of the torso 105 with respect to the primary impact direction VXN. More clearly this may be also the case as depicted in FIG. 4B, where the head 101 is in front of the torso 105 with respect to the primary impact direction VXN.

The infant 100 is also seated with a neck center angle ON between an overall mass axis AG and an approximate neck center NC being substantially less than ninety degrees such that an overall mass reaction force FXO is at least close to perpendicular with respect to the human's neck 104 at the impact aligned orientation. For a given size of the infant 100 and a preferred orientation of the overall mass axis AG in impact initial orientation that is either vertical as shown in FIG. 3 or close to vertical as shown in FIG. 4B, the neck center angle ON is brought to a minimum by increasing a main normal distance DG between the geometrical pivoting center CP and the overall gravity center GO to maximum. The main normal distance DG again may be brought to a maximum by having an outside capsule diameter DC of the spherically guided portion inwardly offset merely by a base thickness TB from an installation diameter DI of a spherical installation space SI. Hence, determining the spherical installation space SI preferably at a maximum within the car 1 may be a first important step for safely seating a human in general and a newly born infant 100 in particular in a vehicle.

Also important may be the step of directly guiding via the fixed base 220 the spherically guided portion 210 substantially concentric with respect to the installation space SI and with respect to the geometric pivoting center CP. The geometric pivoting center CP is defined by the direct guiding interaction of an external spherical guiding member 222 of the base 220 and an internal spherical guiding member 212 of the spherically guided unit 210. The external spherical guiding member 222 more than equatorially encompasses and directly guides the internal spherical guiding member 212 with respect to said geometric pivoting center CP.

In case the vehicle is a passenger car 1 and the spherically guided safety seating system 200 is fixed in the rear of that passenger car 1, the spherical installation space SI may be defined between a backrest 312 and a sitting portion 311 of a rear seat 310 and at least one of a front seat 320 back rest 321 and a cabin ceiling 330. In this case, a base portion 220 of the safety seating system 200 may be fixed in the passenger car 1 at least by assistance of a clamping of that base portion 220 between the rear seat backrest 312 and the front seat backrest 321.

In case the vehicle is a passenger car 1 and the spherically guided safety seating system 200 is fixed in the front of that passenger car, the spherical installation space SI may be defined between a backrest 321 and a sitting portion of a front seat 320 and at least one of a well known dashboard and a cabin ceiling 330. In this case, the base portion 220 may be fixed in the passenger car 1 at least by assistance of a clamping of that base portion 220 between the front seat backrest 321 and the dashboard.

The human body part most rigidly fixed with respect to the spherically guided unit 210 is the torso 105 belted up in a seat 211 in a well known fashion. The seat 211 may be generally configured in a well known fashion for a cushioned seating and belting up of the human or infant 100 inside the internal spherical guiding member 212. The seat 211 is preferably configured as a carrying cradle having a pivotable carrying grip 2112. The carrying cradle 211 and the internal spherical guiding member may feature mating portions 213, 214 of a cradle fixing interface for detachable fixing the carrying cradle 211 within the internal spherical guiding member 210.

The neck 104 is one of the body parts most susceptible to injury. Especially a newly born infant 100 of up to eight months of age has very loosely connected neck vertebras and very little neck muscles and is extremely endangered to suffer spinal cord injury due to excessive angular movement of the head 101 relative to the torso 105. In the present invention, this is especially accounted for by positioning the torso 105 with its torso gravity center GT and the head 101 with its head gravity center GH in a balanced fashion with respect to the overall mass axis AG. Generally, the infant 100 may be seated with respect to the overall mass axis AG, such that the overall mass axis AG propagates at least between the head gravity center GH and the torso gravity center GT which provides also for closest horizontal proximity of the head gravity center GH to the geometric pivoting center CP.

Figure 4A:
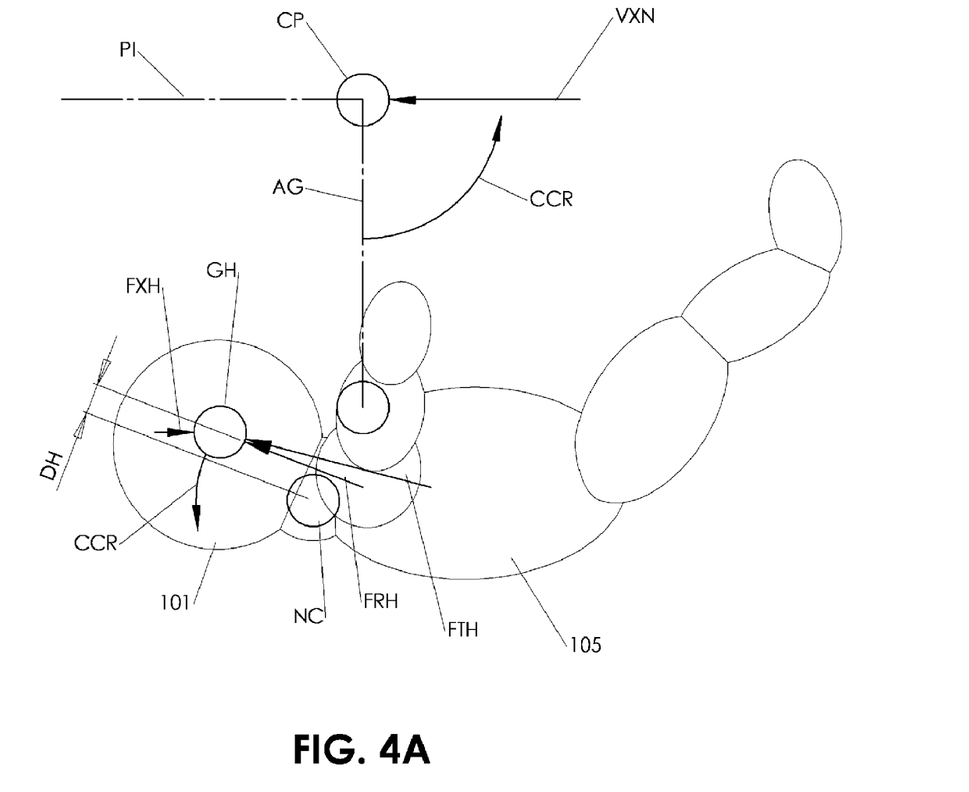
FIG. 4A is a front view of a newly born infant generally positioned with respect to geometric pivoting center and a primary impact plane in accordance with the teachings of the present invention.
Figure 4B:
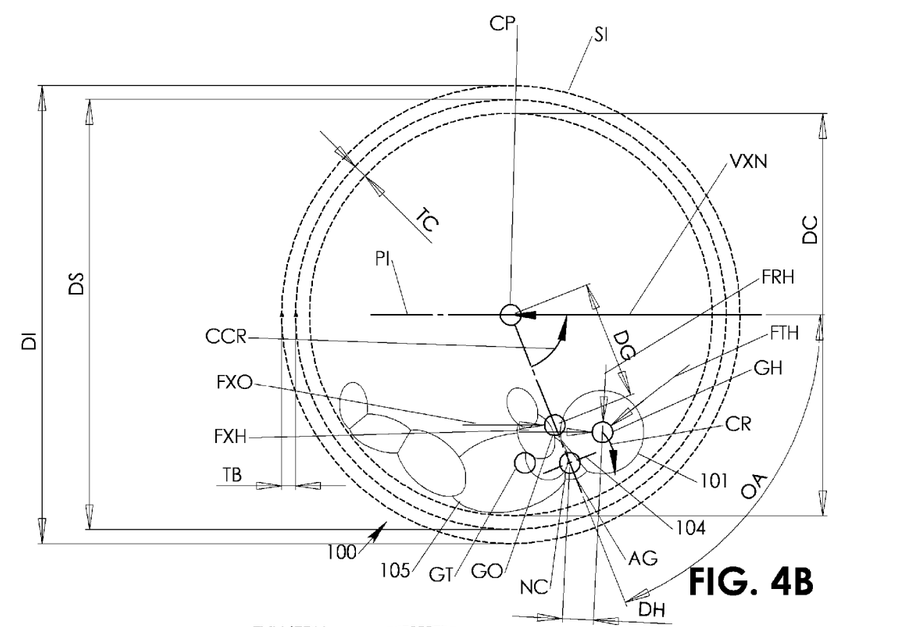
FIG. 4B is a front view of FIG. 3 in impact initial orientation with non-vertical overall mass axis.
Figure 4C:
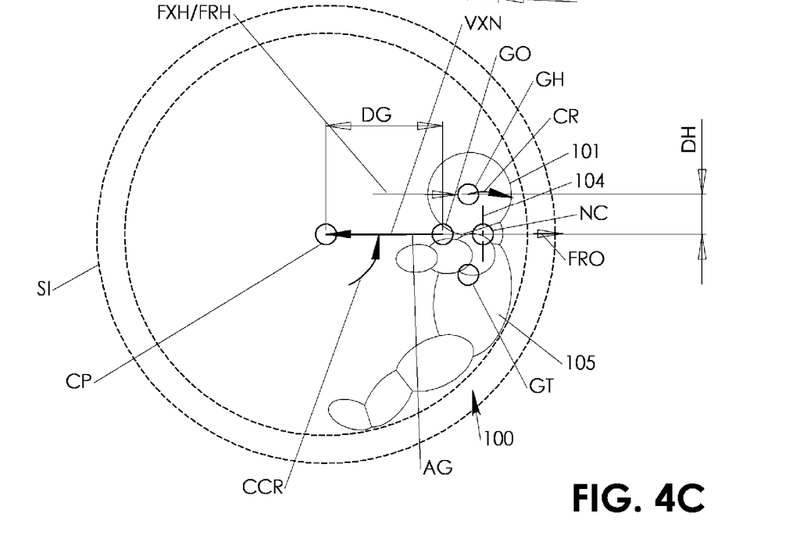
FIG. 4C is a front view of FIG. 3 in impact aligned orientation with the infant positioned with respect to the overall mass axis as in FIG. 4A.
Figure 5:
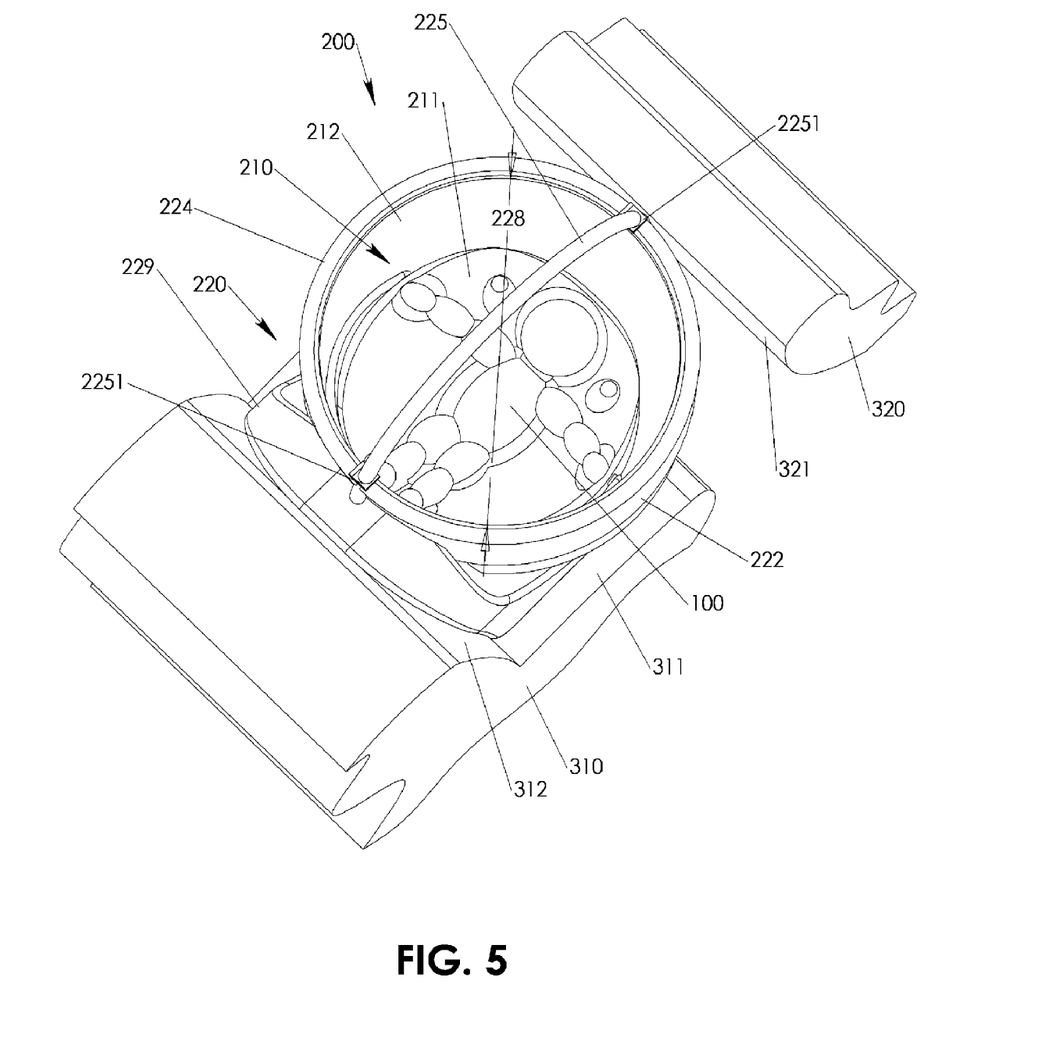
FIG. 5 is a second top perspective view of a simplified spherically guided safety seating system with a seated newly born infant fixed between a backseat and a front seat.
Figure 6:
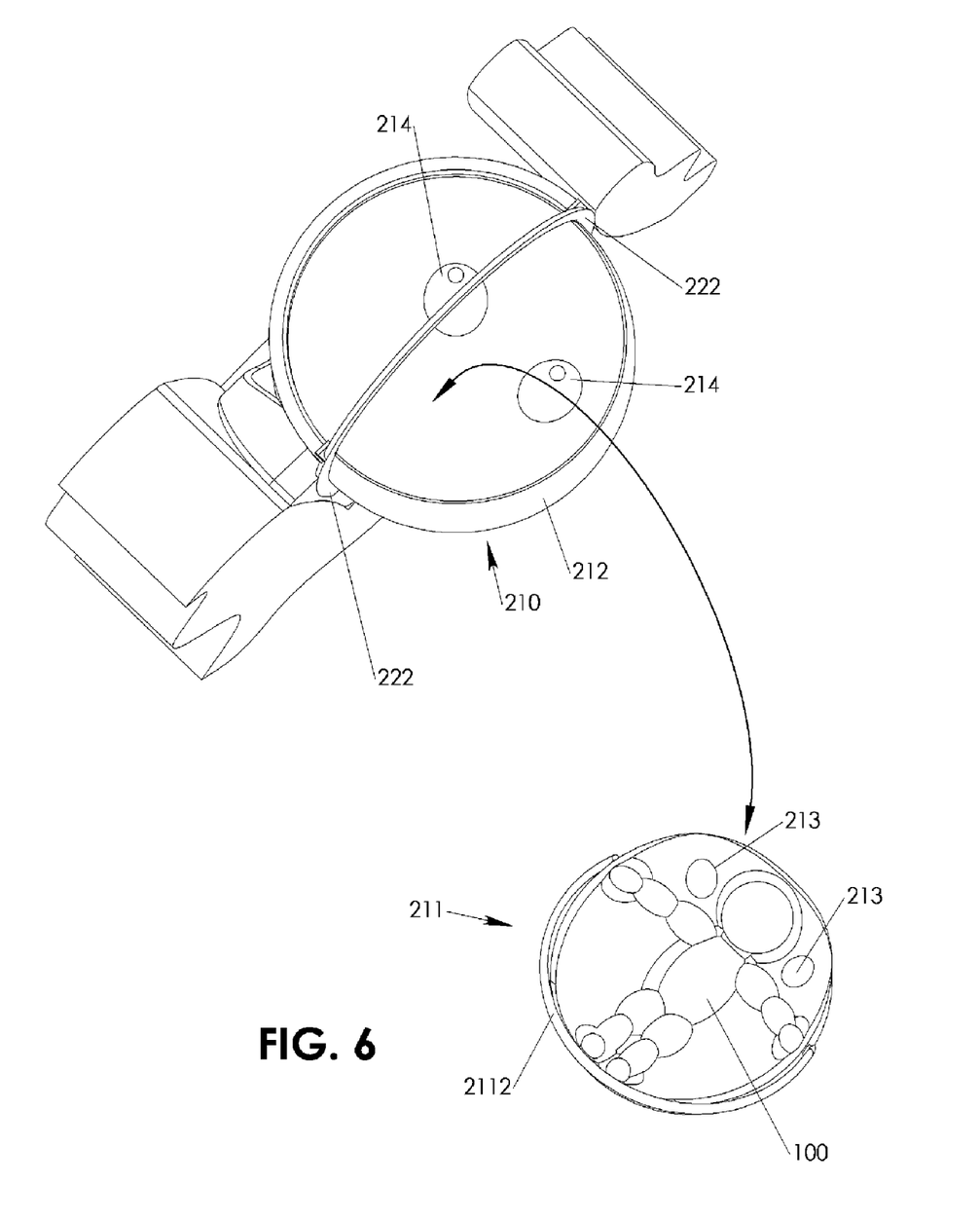
FIG. 6 is the second top perspective view of the spherically guided safety seating system of FIG. 5 with a removed seating cradle and newly born infant. Backseat, front seat and base are cut along a vertical cut plane through a geometric pivoting center and parallel to a primary impact direction.
Figure 7A:
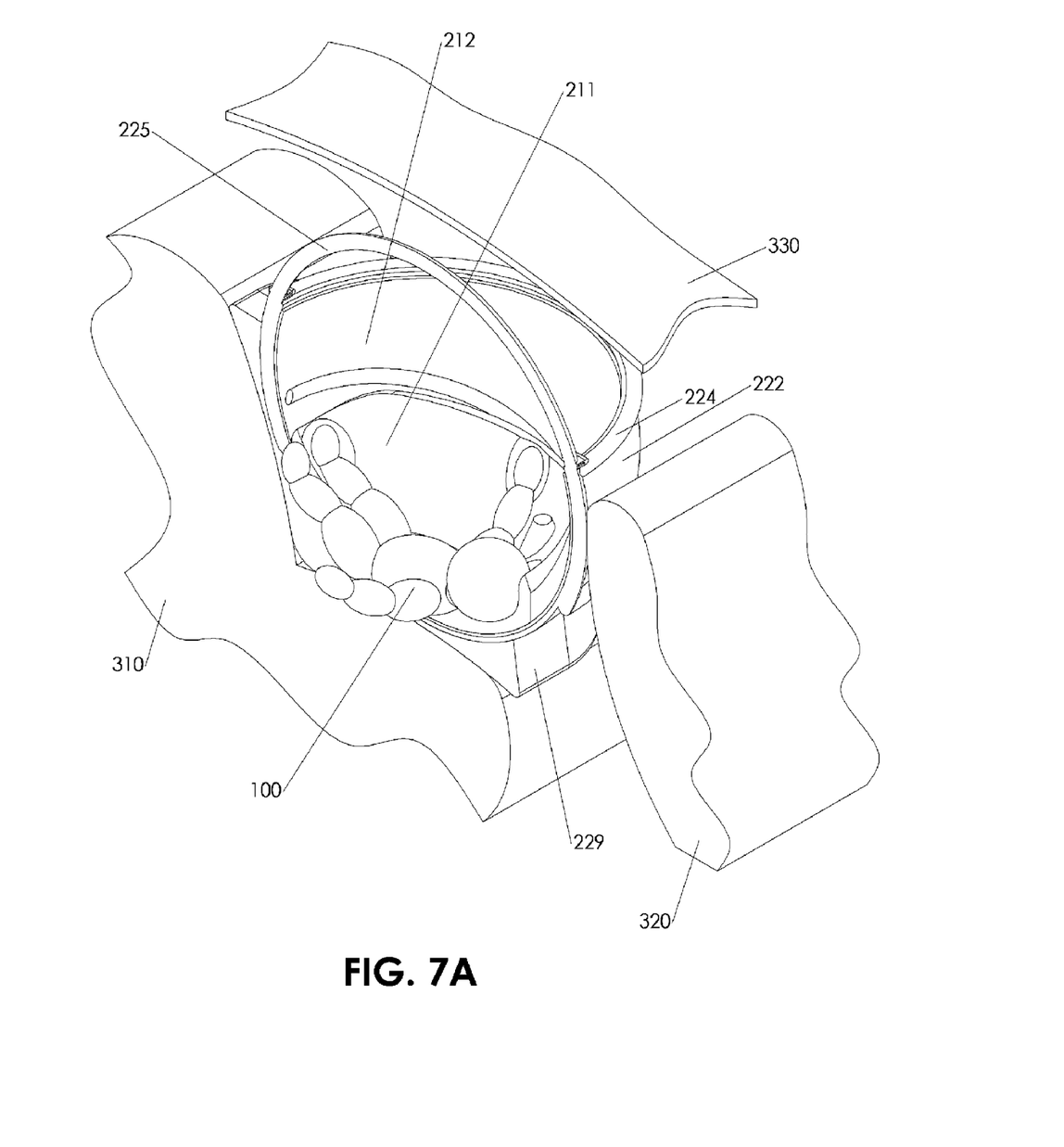
FIG. 7A is a third top perspective cut view of the spherically guided safety seating system of FIG. 5 in impact initial orientation of the spherically guided unit. The cut plane is that of FIG. 6. The infant is uncut depicted.
Figure 7B:
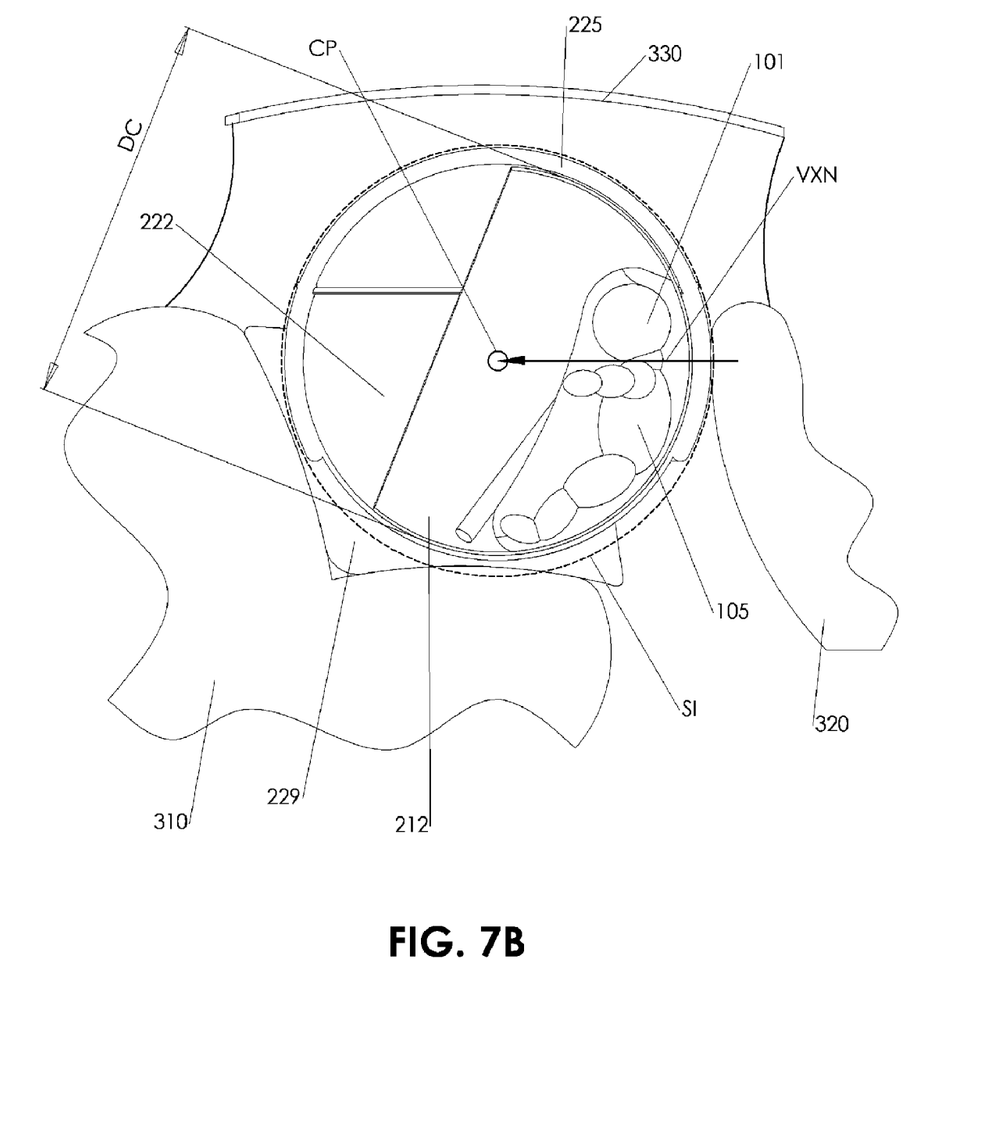
FIG. 7B is a front cut view of the spherically guided safety seating system of FIG. 5. The spherically guided unit is depicted in primary impact aligned orientation aligned with respect to a primary impact direction and rotated around a primary impact rotation axis. The cut plane is that of FIG. 6. The infant is uncut depicted.
Figure 7C:
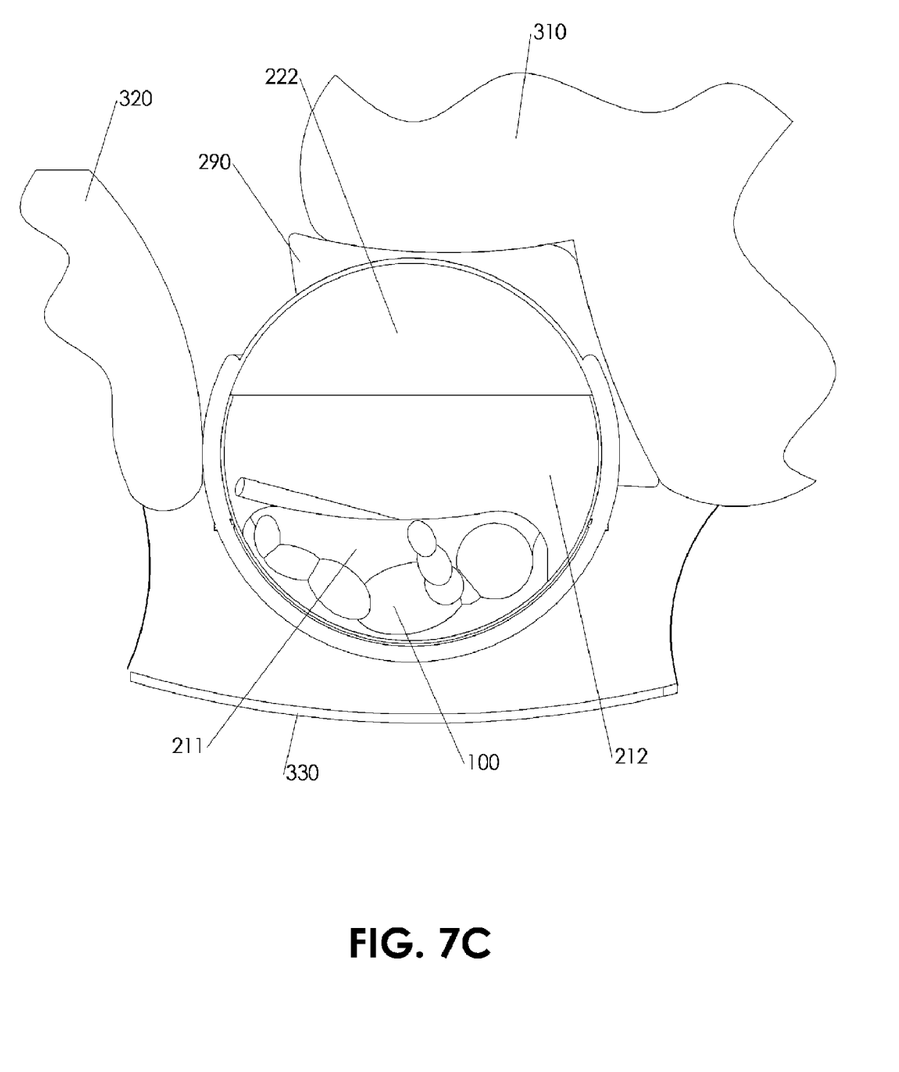
FIG. 7C is the front cut view of FIG. 7B with an upside-down oriented vehicle and a downwards oriented spherically guided unit rotated around the primary impact rotation axis. The cut plane is that of FIG. 6. The infant is uncut depicted.
Figure 7D:
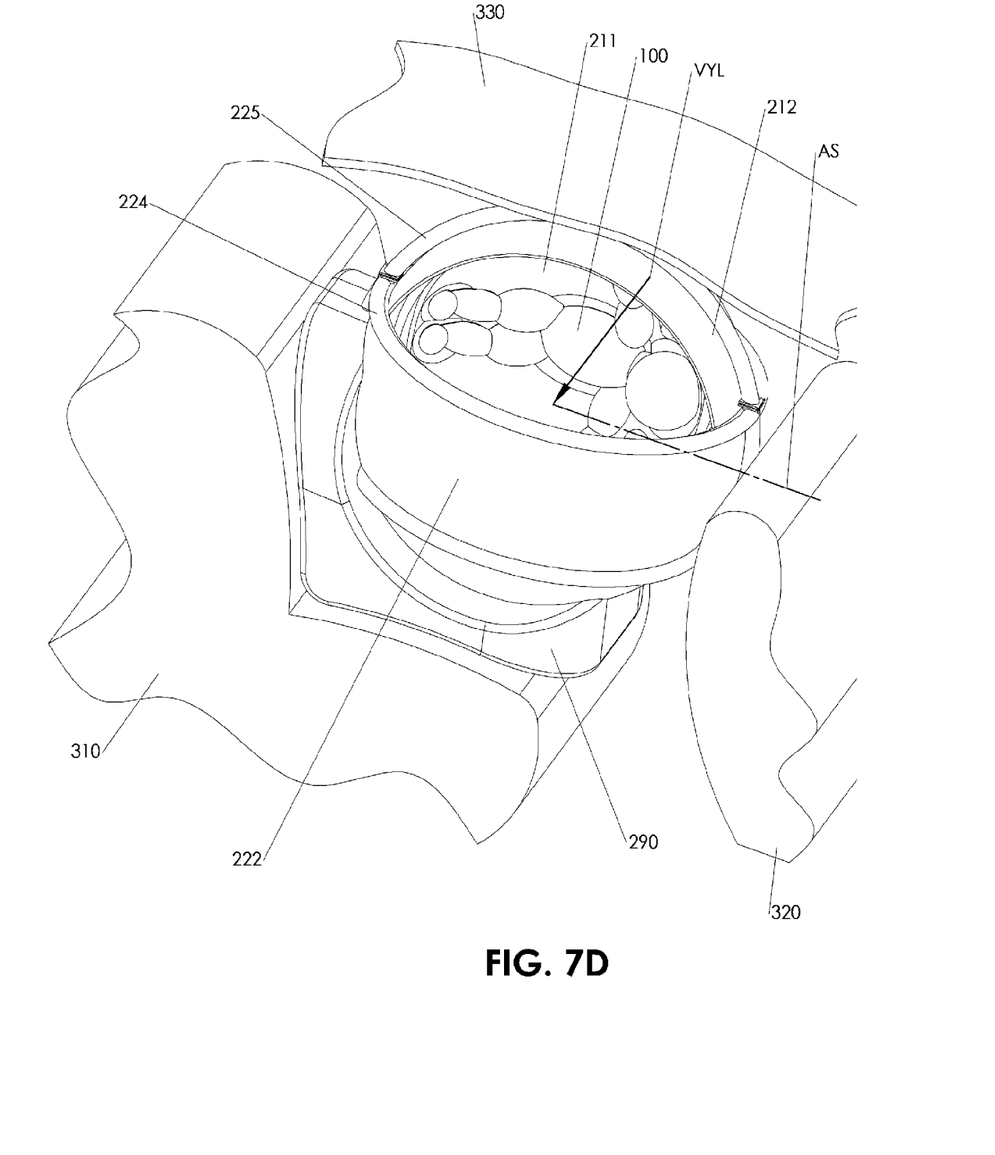
FIG. 7D is a fourth top perspective view of the spherically guided safety seating system of FIG. 5 with the spherically guided unit being in a secondary impact aligned orientation aligned with respect to a secondary impact direction and rotated around a secondary impact rotation axis.

More particular, the infant 100 may be seated with respect to the overall mass axis AG such that the overall mass axis AG propagates about equidistantly between the head gravity center GH and the torso gravity center GT as is illustrated in FIG. 4A. In addition, the infant 100 or human in general may be seated with respect to the geometric pivoting center CP such that the head gravity center GH and the torso gravity center GT are about equidistant to the geometric pivoting center CP. In a real car crash, impact decelerations such as VXN, VXP, VXR, VXL may two dimensionally act via the geometric pivoting center CP and within primary impact plane PI onto the spherically guided unit 210 resulting in rapidly changing overall resulting mass reaction forces FRO, which may be composed from individual components as described for the resulting head mass force FRH. The overall resulting mass reaction forces FRO in turn may move the spherically guided unit 210 via the overall gravity center GO in rapidly changing direction. The head 101 is about ¼ of the overall mass of newly born infant 100. Because of such significant head 101 mass, the balanced positioning of the torso gravity center GT and head gravity center GH with respect to the overall mass axis AG may provide for an even displacement of torso 105 and head 101 within the seat 211 and within a displacement range resulting from a certain resilience of the torso 105 within the seat belts and the head 101 within well known lateral head supports. Hence, angular movement between head 101 and torso 105 and the risk of neck injury may be kept to a minimum. In addition and as depicted in FIG. 4C, the neck 104 may be in closest perpendicularity to the impact direction VXN, VXP, VXR, and as also depicted in FIG. 7D impact direction VXL during impact aligned orientation. This again may also reduce tensile and/or compressive loads on the neck 104.

In a case, where the newly born infant 100 is desired to be kept during impact initial orientation in a slight upright position in which the head gravity center GH may be above the torso gravity center GT, the overall mass axis AG may be artificially held in non-vertical orientation. This may be accomplished by impact releasably holding the spherically guided portion/unit 210 with respect to the base 220. At the same time, the overall mass axis AG may be held in an optimized impact respond angle OA as with respect to a primary impact direction VXN, which is the direction from with the highest impact probability. As depicted in Prior Art FIG. 2 the primary impact direction for a passenger car 1 is from the front with an impact probability of about 48% in case of a crash. Having the optimized impact respond angle substantially less than ninety degrees may for a given impact deceleration VXN and for a given overall momentum of inertia significantly reduce the response time during which the spherically guided portion/unit 210 may rotate from its impact initial orientation of FIG. 4B into the impact aligned orientation of FIG. 4C as may be clear to anyone skilled in the art. The impact releasable hold may be provided by a well known feature such as impact releasing latch.

To clearly ensure that the resulting head reaction mass force FRH acts continuously in a non-switching direction around the neck center NC during impact initial rotation of the spherically guided portion 210 between the impact initial orientation and the impact aligned orientation, the head gravity center GH may be aligned in front of the overall mass axis AG with respect to the primary impact direction VXN as depicted in FIGS. 4B, 4C. By looking at the representative crash snapshots of FIGS. 4A, 4B in which the impact direction is the primary impact direction VXN coming from the right side of the geometric pivoting center CP, the resulting head 101 rotation CR remains clock wise while the spherically guided unit 210 rotation CCR is counterclockwise. Consequently, the head 101 is continuously radially outward forced into contact with the seat 211 of the spherically guided unit 210. The terms "clockwise" and "counterclockwise" are introduced for the sole purpose of general understanding and may vary depending on the view point and impact direction as may be clear to anyone skilled in the art. Non-switching in the context with the present invention means that the direction of rotation around the neck center NC does not change between clockwise and counterclockwise.

Further structural elements of the spherically guided safety seating system 200 may be a well known vehicle attachment interface 229 as part of the base 220. The vehicle attachment interface 229 may be configured in a well known fashion for a snug area contact with backseat 310 and/or front seat 320 of a passenger car 1. Well known seat belt guiding features may utilize the passenger car's 1 seat belts for fixing the spherically guided safety seating system 200 within the car 1 in a well known fashion.

The base 220 may also feature a pivot-protection framing 224 encompassing the spherically guided unit 210 at least in a lateral vicinity of the primary impact plane PI. The pivot-protection framing 224 may be a metal tube frame or integral part of the external spherical guiding member 222. The pivot-protection framing 224 may assist in maintaining the external spherical guiding member's 222 spherical geometry against external forces that may occur during the above described clamping or during crash where the spherically guided safety seating system 220 may be forced into contact with other objects within the car 1.

The pivot-protection framing may additionally feature a top framing member 225 spanning across an access opening 228 of the external spherical guiding member 222. The top framing member 225 may prescribe with its outside contour a top portion of the spherical installation space SI while an inside contour of it may remain outside the outside capsule diameter DC such that the spherically guided unit 210 may fully rotate around a horizontal axis unimpeded by the top framing member 225. The top framing member 225 may provide on one hand protection against collapsing roof in case of a roll over crash and on the other hand provide a visual reference for determining and/or verifying sufficient spherical installation space SI for unimpeded full rotation of the spherically guided unit 210 around a horizontal axis.

The top framing member 225 may be connected to the pivot-protection framing 224 via snap hinges 2251. In that way, the top framing member 225 may be rotated out of the way for an unimpeded insertion or removal of the carrying cradle 211.

The spherical installation space SI may exceed with its installation diameter DI the size of the well known door entrances of the car 1. To accommodate for such case, the base 220 may feature a base 220 assembly interface for detachable combining the external spherical guiding member 222 with the vehicle attachment interface 229 within the car 1. The base 220 assembly interface may include well known features such as a separable form fit.

The spherically guided unit 210 picks up rotational speed between the impact initial orientation and the impact aligned orientation. The rotational speed needs to be dissipated while keeping the response time to a minimum. A centrifugal force proportional brake may be employed to provide highly unimpeded rotation at low angular velocities and for effectively braking high angular velocities. This may be accomplished by utilizing a centrifugal force caused by the rotation of the spherically guided unit 210. The centrifugal force may increase with the square of the spherically guided unit's 210 angular velocity as is well known in the art. The quadratic proportion between centrifugal force and angular velocity may be advantageously utilized by centrifugal force proportional brake in a well known manner to provide high braking forces at angular velocities above a predetermined angular velocity threshold and to provide unimpeded rotation of the spherically guided unit 210 below the angular velocity threshold. A direct friction contact between at least one specifically configured portion of the internal spherical guiding member 212 and/or the external spherical guiding member 222 may be part of the centrifugal force proportional brake to directly utilize the rotating spherically guided unit's 210 mass for contact friction based braking between the external spherical guiding member 222 and the internal spherical guiding member 212.

The internal spherical guiding member 212 may be in direct sliding contact with the external spherical guiding member 222. In that case, at least one of the internal spherical guiding member 212 and the external spherical guiding member 222 may have a low friction sliding surface providing said direct sliding contact. The low friction sliding surface may be of a well known Teflon™ material. Alternately or supplementary, the internal spherical guiding member 212 may be in a direct bearing contact with the external spherical guiding member 222. The direct bearing contact may be provided by bearing balls embedded in the external spherical guiding member 222. Alternately or supplementary, the direct bearing contact may be provided by bearing balls contained in between and in double rolling interaction with the internal spherical guiding member 212 and the external spherical guiding member 222. The double rolling balls may be contained in a well known bearing cage that may be placed in a non contacting fashion between the internal spherical guiding member 212 and the external spherical guiding member 222. The direct spherical guiding provides for large area contact which in turn reduces stress concentrations in the guiding interface and provides for a lightweight construction of the spherically guided unit 210 substantially contributing to a low overall momentum of inertia.

The spherically guided safety seating system 200 may be preferably configured such that the internal spherical guiding member 212 and the external spherical guiding member 222 provide full rotational guiding with respect to the geometric pivoting center CP around a primary impact rotation axis AP substantially perpendicular with respect to the primary impact direction VXN. Consequently, the spherically guided unit 210 may fully rotate within the spherical installation space SI. With respect to the secondary impact directions VXL, VXR, full rotational guiding may be provided similar as with respect to the primary impact direction VXN. Alternately and in the case of limited lateral space available for placing the spherically guided safety seating system 200 within the car 1, the internal spherical guiding member 212 and the external spherical guiding member 222 provide limited rotational guiding with respect to the geometric pivoting center CP around an secondary impact rotation axis AS substantially parallel with respect to the primary impact direction VXN. Limited rotational guiding may be substantially less than 90 degrees off the impact initial orientation.

The spherically guided safety seating system 200 may be fabricated in a well known fashion by use of injection molding and blow molding and other fabrication methods well established for fabrication child safety seats. The pivot-protection framing 224 and the eventual top framing member 225 may be fabricated from metal tubing or other well known fabrication techniques for fabricating a sturdy frame structure.

Prior to its use, the spherically guided safety seating system 200 is eventually assembled within the car 1 and fixed with its base at either a rear seat 310 or a front seat 320. The internal spherical guiding member 212 remains in permanent direct guided contact with the external spherical guiding member 222. The newly born infant 100 may be placed on the cradle seat 211 and together with the cradle seat 211 inserted through the access opening 228 into the spherically guided member 212. After positioning and fixing the cradle seat 211 with respect to the spherically guided member 212, an optional arresting feature may be released. The arresting feature may hold the spherically guided unit 210 fixed with respect to the base during the insertion and fixing of the carrying cradle 211. The arresting feature may be any well known element such as a latch peripherally accessible and acting in between the internal spherical guiding member 212 and the external spherical guiding member 222. For a newly born infant of up to eight months of age, the outside capsule diameter may be about 29.3 inches.

During regular driving of the car 1, the newly born infant 100 may be comfortably suspended within the spherically guided safety seating system 200 highly unaffected by angular car 1 movements commonly occurring during conventional driving. In case of a crash impact, the spherically guided unit 210 responses in a short period and impact aligns the newly born infant 100 irrespective an eventual bouncing of the spherically guided safety seating system 200 within the car 1 due to the unavoidable soft fixing on the car seat's 310, 320 upholstery. Even though an initial rotation may initially exceed the impact aligned orientation, the newly born infant 100 remains highly protected against excessive neck 104 bending and head whip lashing. Once the car 1 is immobile after the crash, the spherically guided unit 210 may pivot into a stable position irrespective of the car's 1 orientation. Rescue personnel may easily remove the newly born infant 100 from the protectively surrounding spherically guided safety seating system 200.

Accordingly, the scope of the invention described in the Figures and the Specification above is set forth by the following claims and their legal equivalent.

What is claimed is:

1. A spherically guided safety seating system comprising:
   a. a base featuring:
      i a vehicle attachment interface having a generally horizontal lower portion to engage a seat portion of a seat of a passenger vehicle and a generally vertical portion to engage a seat back of the seat of the passenger vehicle, the vehicle attachment interface adapted to provide a snug area of contact between the vehicle attachment interface and the seat of the passenger vehicle and removably fix the spherically guided safety seating system on the seat of the passenger vehicle; and
      ii an external spherical guiding member having a first surface defining a portion of a sphere, wherein the external spherical guiding member is sized to fit within the passenger vehicle on the seat of the passenger vehicle, the first surface defining a geometric center point;
   b. a spherically guided unit featuring:
      i an internal spherical guiding member having a second surface defining a portion of a sphere, wherein the second surface mates with the first surface such that the spherically guided unit is freely rotatable in any direction about a spherical path, the spherical path defined by the geometric center point of the first surface; and
      ii a head whip lash minimizing seating including a head positioning region and a torso positioning region that are:
         1. in radially close proximity to said internal spherical guiding member; and
         2. substantially below said geometric center point while at rest.

2. The spherically guided safety seating system of claim 1, wherein said base further comprises a pivot-protection frame.

3. The spherically guided safety seating system of claim 2, wherein said pivot-protection frame is an integral part of said external spherical guiding member.

4. The spherically guided safety seating system of claim 2, wherein said pivot-protection frame is connected to a top framing member spanning across an access opening of said external spherical guiding member, whereby said top framing member features an outside contour and an inside contour, said outside contour prescribes a top portion of a spherical installation space of said vehicle, and said inside contour is outside an outside capsule diameter such that said spherically guided unit may fully rotate around an axis unimpeded by said top framing member.

5. The spherically guided safety seating system of claim 4, wherein said top framing member is connected to said pivot-protection framing via a snap hinge providing manually releasable positioning of said top framing member said across said access opening.

6. The spherically guided safety seating system of claim 1, further comprising a centrifugal force proportional brake.

7. The spherically guided safety seating system of claim 1, wherein said seat is configured as a carrying cradle and wherein said carrying cradle and said internal spherical guiding member further comprise mating portions of a cradle fixing interface for detachably fixing said carrying cradle within said internal spherical guiding member.

8. The spherically guided safety seating system of claim 1, wherein direct sliding contact is provided between said second surface of said internal spherical guiding member and said first surface of said external spherical guiding member.

9. The spherically guided safety seating system of claim 8, wherein at least one of said second surface of said internal spherical guiding member and said first surface of said external spherical guiding member is a low friction sliding surface providing said direct sliding contact.

10. The spherically guided safety seating system of claim 1, wherein bearing contact is provided between said second surface of said internal spherical guiding member and said first surface of said external spherical guiding member.

11. The spherically guided safety seating system of claim 10, wherein said bearing contact is provided by bearing balls embedded in said external spherical guiding member.

12. The spherically guided safety seating system of claim 10, wherein said bearing contact is provided by bearing balls contained in between and in double rolling interaction with said internal spherical guiding member and said external spherical guiding member.

13. The spherically guided safety seating system of claim 1, wherein said vehicle is a passenger car, wherein said vehicle attachment interface is configured to be attached to one of a rear seat and a front seat and wherein the head whip lash minimizing seating is configured to accept an infant.

14. The spherically guided safety seating system of claim 1, wherein said internal spherical guiding member and said external spherical guiding member provide full rotational guiding with respect to said geometric center point around a first rotation axis.

15. The spherically guided safety seating system of claim 1, wherein said internal spherical guiding member and said external spherical guiding member provide limited rotational guiding with respect to said geometric center point around a second rotation axis.

16. The spherically guided safety seating system of claim 1, wherein said external spherical guiding member is more than equatorially encompassing said internal spherical guiding member.

17. The spherically guided safety seating system of claim 1, wherein said spherically guided unit is rotationally freely guided in said base during an impact initial orientation of said spherically guided unit.

18. The spherically guided safety seating system of claim 6, wherein the centrifugal force proportional brake comprises at least one portion of the internal spherical guiding member in direct friction contact with the external spherical guiding member.

* * * * *